Jan. 7, 1947.  F. W. WELLS  2,414,077
LAWN MOWER
Filed Nov. 18, 1943  2 Sheets-Sheet 2

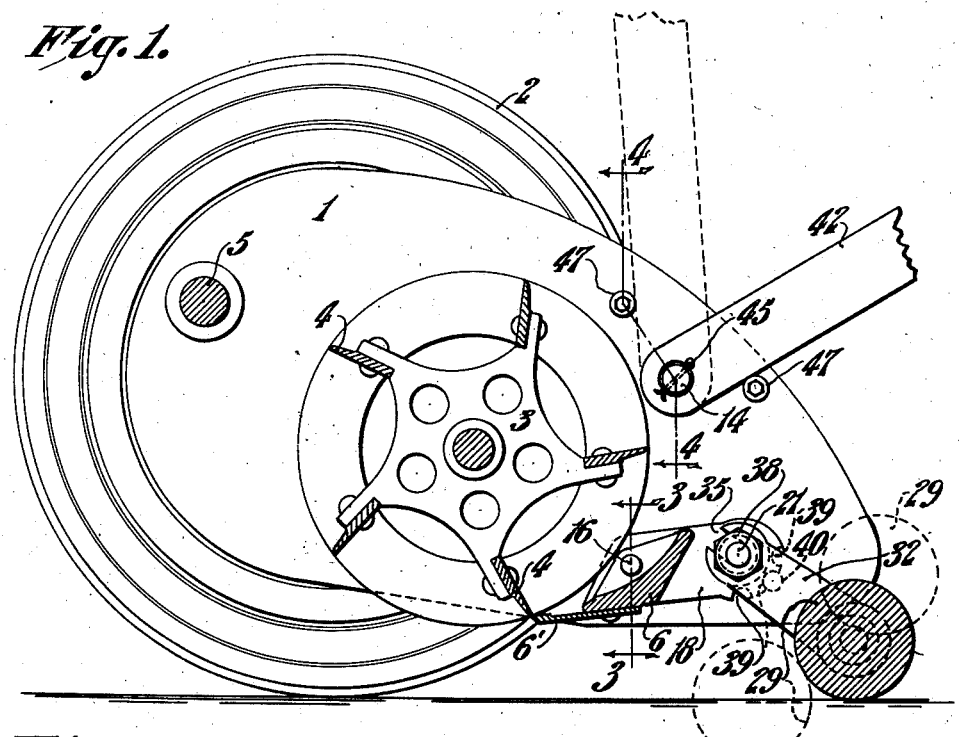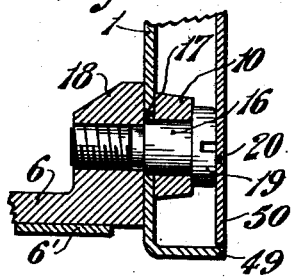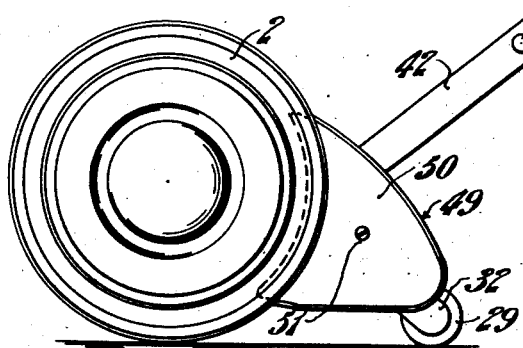

INVENTOR,
F. Warren Wells,
BY Blake Seaver
ATTORNEY.

Patented Jan. 7, 1947

2,414,077

UNITED STATES PATENT OFFICE 2,414,077

LAWN MOWER

Fred Warren Wells, Springfield, Mass., assignor to Blair Manufacturing Company, Springfield, Mass., a corporation of Massachusetts Application November 18, 1943, Serial No. 510,781

3 Claims. (Cl. 56—249)

This invention relates to improvements in lawn mowers, and is, particularly, directed to improvements in the lawn mower construction disclosed and described in Patent #2,269,920, issued January 13, 1942, to Blake A. Seaver, and assigned to the Blair Manufacturing Company.

An object of the invention is to provide, in a lawn mower having a pair of traction wheels, a cutting reel driven from the traction wheels, and a stationary cutter bar cooperating with the cutting reel, novel and efficient means for adjustably positioning, holding, and locking the cutter bar, relative to the cutting reel.

A further object of this invention is to provide, in a lawn mower construction having an adjustable cutter bar, means connected with and cooperating with the cutter bar for adjustably positioning, holding, and locking a roller for controlling the height of the cut of the lawn mower.

These, and other objects and advantages of this invention, will be clearly disclosed and described in the specification, the accompanying drawings and the appended claims.

Broadly, this invention comprises, in a lawn mower construction having traction wheels supported on spaced side frames and a cutting reel supported in said side frames and driven by said traction wheels, a stationary cutter bar pivotally supported on the side frames, a cam secured to the cutter bar and engaged in a side frame for moving the cutter bar about its pivotal support, means for locking the cam in adjusted position, a roller pivotally supported on the cutter bar, and means for locking the roller in two or more positions for regulating the height of the cutter bar relative to the roller.

Figure 5:
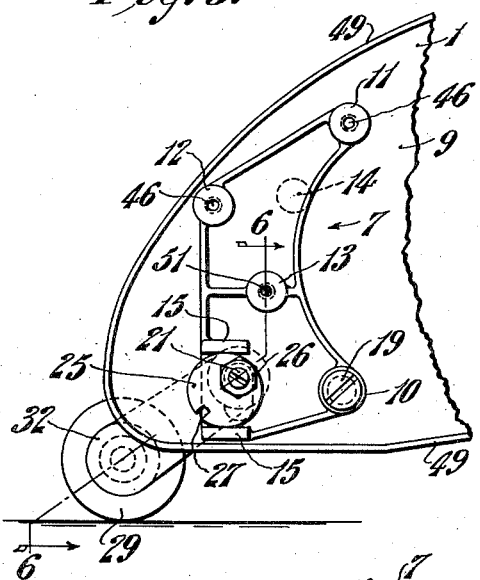
Figure 7:
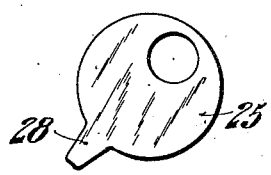
Figure 6:
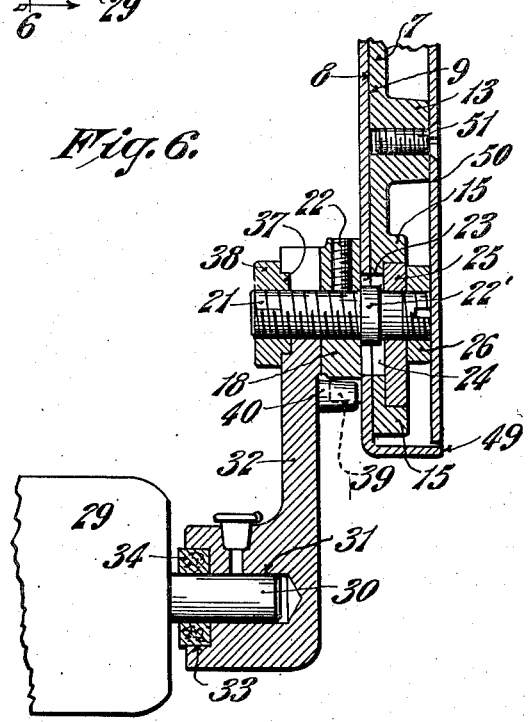
Figure 8:
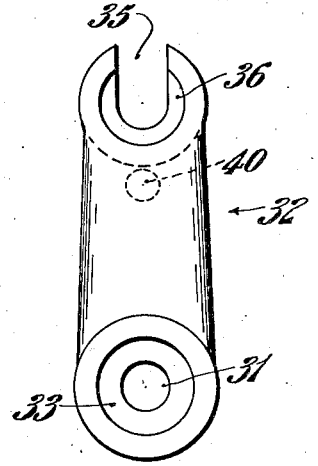

A preferred embodiment of this invention is illustrated in the accompanying drawings, in which Fig. 1 is a sectional view of a lawn mower construction, Fig. 2 is a side elevational view of the same, Fig. 3 is a sectional view taken on the line 3—3 of Fig. 1, Fig. 4 is a sectional view taken on the line 4—4 of Fig. 1, Fig. 5 is a partial side view, looking from the opposite side of Fig. 1, with the outside plate removed, Fig. 6 is a sectional view taken approximately on the line 6—6 of Fig. 5, Fig. 7 is an elevational view of a modified form of adjusting cam, and Fig. 8 is an elevational view of one of the roller brackets.

Referring now to the drawings in detail, in which like numerals refer to like parts throughout, A lawn mower has a pair of side frames 1, revolvably supporting traction wheels 2 and a cutting reel 3 having helical cutting blades 4.

The traction wheels 2 are operatively connected to the cutting reel 3 in the usual manner, by gears, pinions, etc., not shown. The side frames 1 are connected by a brace rod 5 and a cutter bar 6. A cutting blade 6' is secured on the bar 6 and extended to cooperating relationship with the blades 4 of the reel 3.

Whereas, in the drawings, with the exception of Fig. 2, and in this description, the construction of the right hand side of the lawn mower, looking from the rear or handle bar end, is illustrated and explained, it should be understood that the left hand, or opposite side, is the same or similar.

A supporting and reinforcing plate 7, having a flat face 8, is secured in the side frame 1 with its flat face 8 against the outer face 9 of the side frame 1. The plate 7 is provided with outwardly extending bosses 10, 11, 12, and 13, and an inwardly extending lug or boss 14, and is ribbed, as best shown in Fig. 5, for added strength and rigidity. The frame 7 is also provided with substantially horizontal, spaced, parallel shoulders or ways 15, the purpose of which will be described.

The cutter bar 6 is pivotally supported on the side frames 1 by means of studs 16, engaged in bosses 10, extending through openings 17 formed in the side frames 1, and threadably secured in end flanges 18 formed on the cutter bar 6. Adjustment of the cutting blade 6', relative to the blades 4 of the cutting reel 3, is provided by movement of the cutter bar 6 about its pivotal supporting studs 16. The studs 16 are provided with heads 19 having flat outer faces 20, the purpose of which will be later explained.

In spaced relation to the pivot studs 16, adjusting studs 21 are fixedly secured, by any suitable means, such as set screws 22, in the end flanges 18, with a shoulder portion 22' engaged against the outer face of the end flange 18. The studs 21 project both inwardly and outwardly from the flanges 18. The outer portion of the stud 21 projects through registering slots 23 and 24 in the side frame 1 and plate 7, respectively, and is eccentrically engaged in a disc or cam 25. The disc or cam 25 is engaged between the shoulders or ways 15 on the plate 7, and rotation of the member 25 will move the stud 21 in an arc having a radius equal to the distance between the pivot stud 16 and the stud 21, thus moving the cutter bar 6 about its pivotal supports 16, and raising or lowering the blade 6' relative to the cutting reel 3. The cutter bar 6 is securely clamped in adjusted position by means of a nut 26 threadably engaged on the outer end of the stud 21. Manipulation of the cam or disc 25 is provided for by means of a radial slot 27 formed therein. The point of a screwdriver or other small tool may be inserted in the slot 27, and with the nut 26 released from clamping engagement, the disc 25 may be easily turned or rotated in either direction.

A modified form of cam or adjusting disc is shown in Fig. 7, in which the disc 25 is provided with an extending lug or arm 28, which may be grasped with pliers, wrench, or other tool, or may be moved by wedging a screw driver between the element 28 and one of the shoulders 15.

Simplicity and economy of structure and improved efficiency of operation have been obtained by adjustably mounting and supporting the lawn mower roller on the end flanges 18 of the cutter bar 6. A roller 29 is provided with trunnions 30 which are revolvably supported in bores 31 formed in roller brackets 32. The roller brackets 32 are counterbored at 33 to provide sockets for dust washers and oil retainers 34 of felt or other suitable material. The upper ends of the brackets 32 are formed with slots 35 for receiving the inwardly extending ends of the studs 21, and are counterbored at 36 for receiving shoulders 37 on locking nuts 38. The lower rear edges of the end flanges 18 of the cutter bar 6 are provided with spaced notches 39 for engagement on outwardly extending lugs or bosses 40 on the roller brackets 32. Adjustment of the roller bracket height relative to the cutter bar is accomplished by backing off the locking nuts 38 until the shoulders 37 clear the counterbores 36, then sliding the roller brackets 32 away from the studs 21 until the lugs 40 clear the notches 39 in which they were engaged, then moving the roller brackets about the studs 21 as a pivot until the lugs 40 align with the desired notches 39, then moving the brackets upwardly until the studs 21 are seated in the slots 35 and the lugs 40 are engaged in the chosen notches 39, then turning up the locking nuts 38 into locking engagement again. Thus the roller 29 is, in operative position, securely supported and locked in adjusted position and, as the end flanges of the cutter bar 6 are alike in location of notches 39, the axis of the roller 29 is positively locked and maintained in parallel relationship with the cutter bar 6 and the cutting lip of the cutting blade 6'.

The inwardly extending bosses or lugs 14 on the reinforcing plates 7 project through openings 41 in the side frames 1 registering therewith, and serve as pivotal supports for handle brace rods 42, which are secured on a handle bar 43 by bolts or rivets 44, in the usual manner. The brace rods 42 may be removably secured on the lugs 14 by means of cotter pins 45. Screws 46, having head portions 47, project through openings 48 in the side plates 1, and are engaged in bosses 11 and 12 of the plates 7. These screws 46 serve a double purpose. In cooperation with the cutter bar pivot studs 16, the screws 46 rigidly secure the plates 7 in the side frames 1. The heads 47 of the screws 46 serve as stops for limiting the upper and lower movements of the handle brace rods 42.

The outer faces of the bosses 11, 12, and 13, and the outer faces of the nut 26 and head 19 of stud 16, are all arranged in the same plane, and the relation of the plane of these faces to the outer edge of the flanges 49 of the side frames 1 is such that, when cover plates 50 are laid on these faces and secured in place by engagement of screws 51 in bosses 13, the outer faces of cover plates 50 will be flush with the outer edges 49 of the side frames 1. Thus the cover plates 50 are firmly supported and removably fastened in position.

In one form of this invention, the ribs 52 of the reinforcing plates 7 are terminated in the same plane with the faces of the bosses 11, 12 and 13, the stud head 19 and nut 26, thus providing, in cooperation with the cover plate 50, a sealed chamber barring grass cuttings and the like from access to the cam control of the cutter bar.

Having thus disclosed and described my invention, what I claim is:

1. In a lawn mower construction, a pair of outwardly flanged side frames, a reinforcing plate rigidly secured on the outer face of each of said side frames, each of said plates being provided with a plurality of outwardly extending bosses and an inwardly extending lug, said lugs projecting through openings in said side frames, handle braces pivotally supported on said lugs, a pair of stop screws engaged in two of said bosses in each plate and securing said plates to said side frames with the heads of said screws projecting inwardly and serving as stops for limiting the pivotal movement of said handle braces, at least three of the bosses in each plate being provided with outer faces in the same plane, cover plates supported on said faces with outer surfaces flush with the outer edges of the flanges on said side frames, and means for removably securing said cover plates on one of said bosses in each plate.

2. In a lawn mower construction, a pair of spaced side frames, a cutting reel rotatably supported in said side frames, a cutter bar pivotally supported on said side frames on an axis parallel to the axis of said cutting reel, said cutter bar being provided with end flanges, axially aligned studs secured in said end flanges and spaced from the pivotal axis of said cutter bar, the axis of said studs being parallel to the pivotal axis of said cutter bar, cam means on said studs for moving said cutter bar about its pivotal axis, means for clamping said cam means in adjusted position. the rear edges of said end flanges being formed with a plurality of spaced locating notches, roller brackets removably engaged on said studs, a lug on each of said roller brackets for engagement in said locating notches, and means for clamping said roller brackets to said end flanges in adjusted position.

3. In a lawn mower construction, a pair of spaced, outwardly flanged side frames, a cutting reel rotatably supported in said side frames, reinforcing plates rigidly secured on the outer faces of said side frames, a cutter bar provided with end flanges and having a cutting edge parallel to the axis of said cutting reel, axially aligned pivot studs rotatably supported in said plates, rotatably engaged in said side frames, and fixedly secured in said end flanges, the axis of said pivot studs being parallel to the cutting edge of said cutter bar, axially aligned adjusting studs secured in said end flanges and spaced from said pivot studs, the axis of said adjusting studs being parallel to the axis of said pivot studs, cam means on said adjusting studs, parallel ways on said plates cooperating with said cam means for moving said cutter bar about its pivotal axis, roller brackets pivotally and removably supported on said adjusting studs, cooperating means on said roller brackets and said end flanges for adjustably positioning said roller brackets about their pivotal axis on said adjusting studs, and a cover plate removably secured on each of said reinforcing plates flush with the outer edges of the side frame flanges and enclosing said cam means.

F. WARREN WELLS.